US007616862B2

(12) United States Patent
Yoo et al.

(10) Patent No.: US 7,616,862 B2
(45) Date of Patent: Nov. 10, 2009

(54) RECORDING MEDIUM HAVING DATA STRUCTURE FOR MANAGING VIDEO DATA AND ADDITIONAL CONTENT DATA THEREOF AND RECORDING AND REPRODUCING METHODS AND APPARATUSES

(75) Inventors: Jea Yong Yoo, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1169 days.

(21) Appl. No.: 10/839,183

(22) Filed: May 6, 2004

(65) Prior Publication Data
US 2004/0223741 A1    Nov. 11, 2004

(30) Foreign Application Priority Data
May 6, 2003    (KR) .............. 10-2003-0028539

(51) Int. Cl.
*G11B 27/00* (2006.01)
(52) U.S. Cl. ............... 386/55; 386/46; 386/124
(58) Field of Classification Search .......... 386/46, 386/95, 97, 98, 124–126, 55
See application file for complete search history.

(56) References Cited

U.S. PATENT DOCUMENTS

| 5,884,004 A | * | 3/1999 | Sato et al. .............. 386/98 |
| 6,334,024 B1 | * | 12/2001 | Ohishi et al. ............ 386/95 |
| 6,999,674 B1 | * | 2/2006 | Hamada et al. .......... 386/95 |
| 2003/0012558 A1 | | 1/2003 | Kim et al. |

FOREIGN PATENT DOCUMENTS

| JP | 2003-249057 | 9/2003 |
| WO | WO 95/12197 | 5/1995 |

OTHER PUBLICATIONS

Office Action issued May 9, 2008 by the Indian Patent Office in counterpart Indian Patent Application No. 5010/DELNP/2005.

* cited by examiner

*Primary Examiner*—Thai Tran
*Assistant Examiner*—Mishawn Dunn
(74) *Attorney, Agent, or Firm*—Harness, Dickey & Pierce, P.L.C.

(57) ABSTRACT

The present invention relates to a data structure for managing video data and additional content data recorded on a recording medium. A recording medium having the data structure for managing video and its additional content data in accordance with the present invention comprises: a navigation area storing at least one navigation file, the navigation file including at least one navigation command group, at least one navigation command group including at least one navigation command for managing reproduction of additional content data to be reproduced with main data recorded on the recording medium, at least one command group indicating at least one playlist to reproduce, the at least one playlist including reproducing information related with the additional content data.

20 Claims, 6 Drawing Sheets

| Value | Description |
|---|---|
| 0x02 | MPEG-2 video stream |
| 0x80 | HDMV LPCM audio stream |
| 0x81 | Dolby AC-3 audio stream |
| 0x82 | dts audio stream |
| 0x90 | Subtitle graphics stream |
| 0x91 | Interactive graphics stream |
| 0x99 | ENAV stream |

FIG. 5

*Alignment of AV & ENAV Data on a BD-ROM*

RECORDING MEDIUM HAVING DATA STRUCTURE FOR MANAGING VIDEO DATA AND ADDITIONAL CONTENT DATA THEREOF AND RECORDING AND REPRODUCING METHODS AND APPARATUSES

1. TECHNICAL FIELD

The present invention relates to a recording medium having a data structure for managing video data and additional content data recorded thereon as well as methods and apparatuses for reproduction and recording the data structure.

2. BACKGROUND ART

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

In addition, the standardization for high-density read-only optical disks such as the Blu-ray ROM (BD-ROM) is still under way. An effective data structure for recording and managing additional contents associated with main video/audio data along with the main data on the high-density read-only optical disk such as a BD-ROM is not yet available.

3. DISCLOSURE OF INVENTION

It is an object of the present invention to provide a recording medium having a data structure for accommodating main data and additional content data thereof to file structure of the recording medium and managing them recorded thereon, and methods and apparatuses for recording and reproducing the video data on such a recording medium.

A recording medium having a data structure for managing main video and its additional content data in accordance with the present invention comprises: a navigation area storing at least one navigation file, the navigation file including at least one navigation command group, at least one navigation command group including at least one navigation command for managing reproduction of additional content data to be reproduced with main data recorded on the recording medium, at least one command group indicating at least one playlist to reproduce, the at least one playlist including reproducing information related with the additional content data.

In one embodiment, the video data and the additional content data are interleaved each other in a single clip file.

The present invention further provides apparatuses and methods for recording and reproducing the data structure according to the present invention, and recording and reproducing according to the present invention.

4. BRIEF DESCRIPTION OF DRAWINGS

The above features and other advantages of the present invention will be more clearly understood from the following detailed description taken in conjunction with the accompanying drawings, in which.

5. MODES FOR CARRYING OUT THE INVENTION

In order that the invention may be fully understood, preferred embodiments thereof will now be described with reference to the accompanying drawings.

Figure 1:
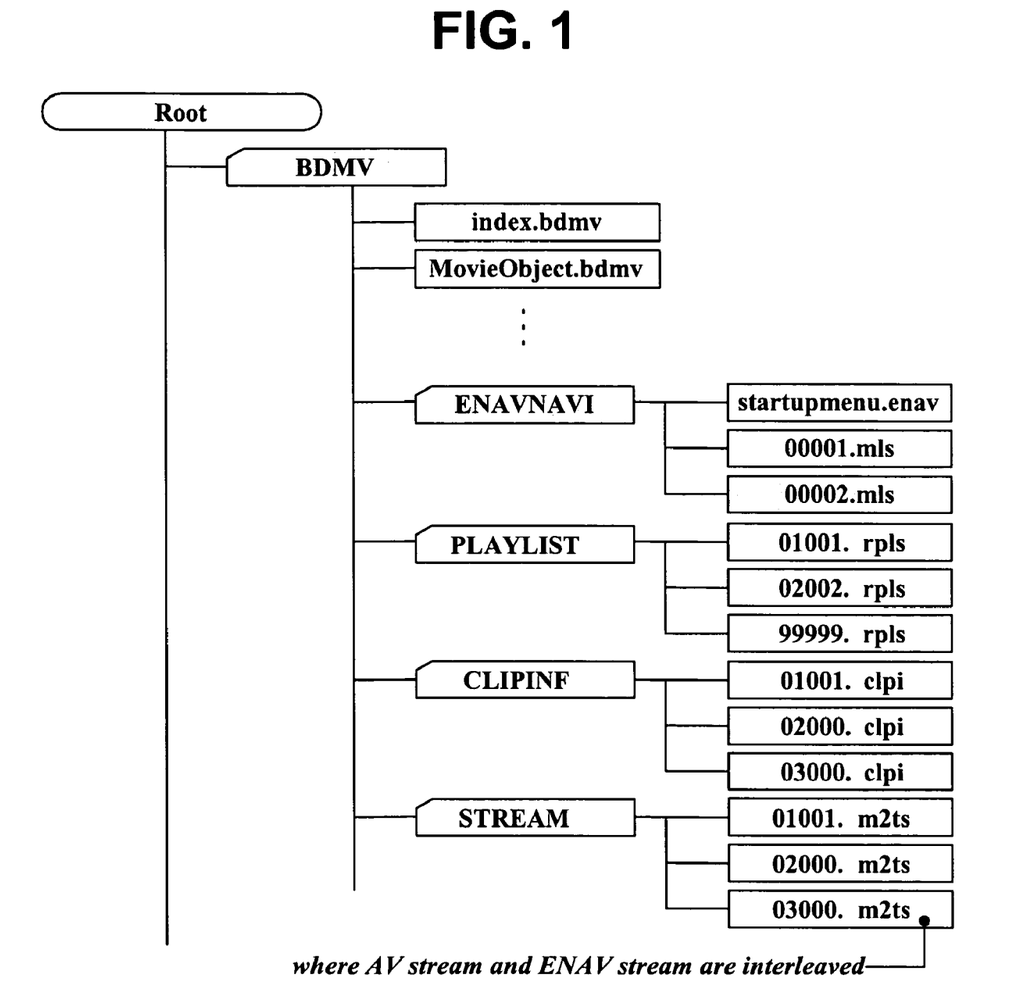
FIG. 1 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 1.

As shown in FIG. 1, the root directory contains at least one BDMV directory. The BDMV directory includes an index file 'index.bdmv', a movie object file 'MovieObject.bdmv', a PLAYLIST directory in which playlist files (e.g., real (*.rpls) and virtual (*.vpls)) are stored, a CLIPINF directory in which clip information files (*.clpi) are stored, a STREAM directory in which MPEG2-formatted A/V stream clip files (*.m2ts), corresponding to the clip information files, are stored, and an ENAVNAVI directory in which a startup menu file 'startupmenu.enav' for additional content data and navigation information files (*.mls) for additional content data included in stream clip files are stored. The structure of the ENAVNAVI directory will be described in detail below.

The index file 'index.bdmv' included in the BDMV directory stores information to describe the content of the BDMV directory. The movie object file 'MovieObject.bdmv' stores information of one or more movie objects. The movie object associated with one or more playlists, consists of at least one executable navigation command, that is, the movie object is a navigation command group and each command of the group is to manage reproduction of data included in at least one clip file pertaining to the movie object. The mutual relation among the index file, the movie object, the playlist, and the clip file will be described in detail below.

The STREAM directory includes MPEG2-formatted A/V stream files called clips (*.m2ts). Each clip file includes only A/V stream or both stream of A/V and additional content data. Main A/V and addition content data in a single clip file are multiplexed or interleaved each other in a certain unit, e.g., in the unit of a PES (Packetized Elementary Stream) packet. The A/V stream includes source packets of video and audio data or additional content data. For example, a source packet of video data includes a header and a transport packet. A source packet includes a source packet number, which is generally a sequentially assigned number that serves as an address for accessing the source packet. Transport packets include a packet identfiler (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC)

sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips. Namely, the real playlist is considered as referring to parts of clips, and therefore, conceptually considered equivalent in disk space to the referred to parts of the clips.

Figure 2:
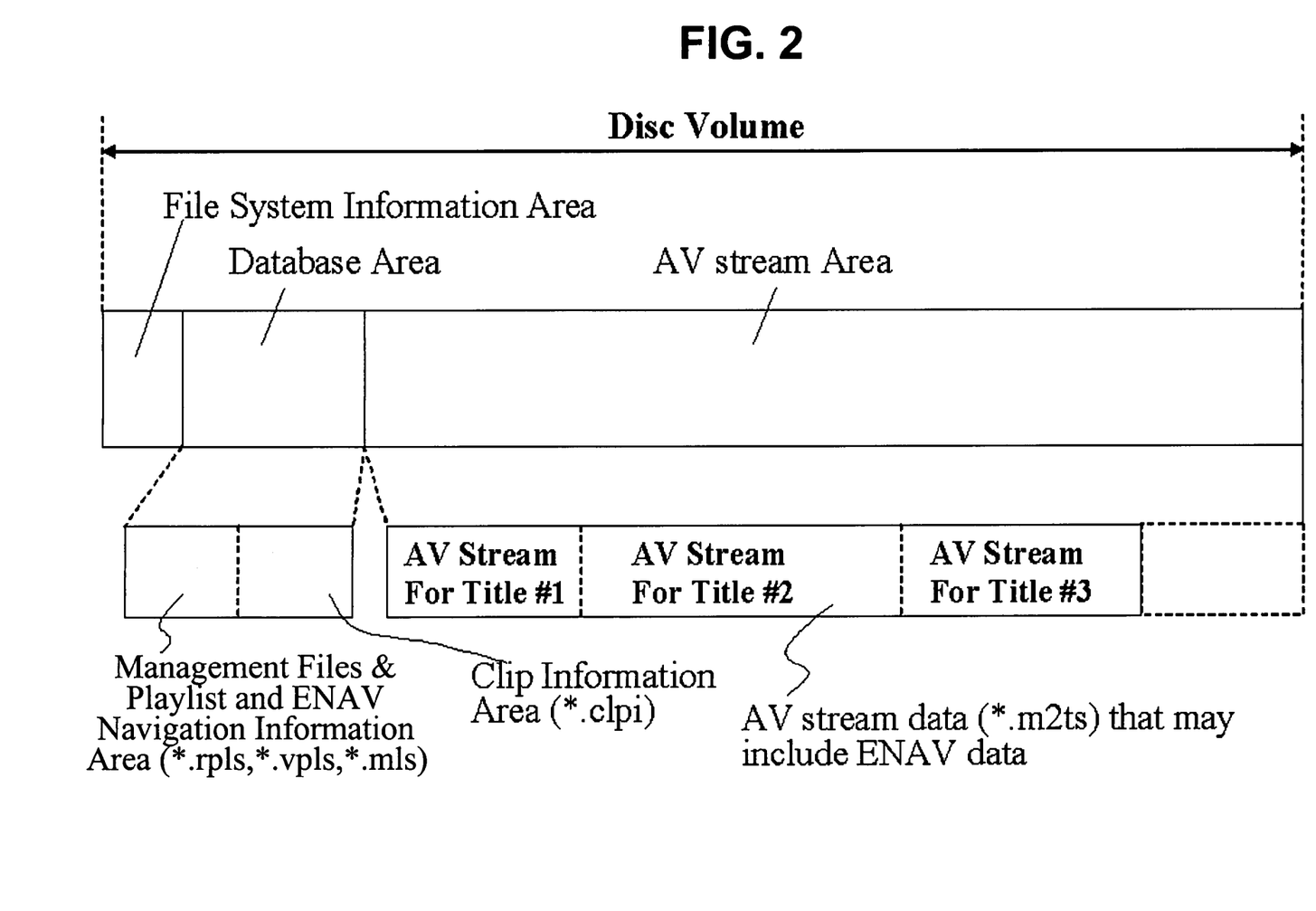
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the management information file (index.bdmv, MovieObject.bdmv) is recorded in one or more management information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area.

The data base area includes a management information file and playlist and additional content navigation information area and a clip information area. The management information file and playlist and additional content navigation information area have the management information files 'index.bdmv' and 'MovieObject.bdmv' recorded in a general information file area thereof, the ENAVNAVI directory and navigation information files recorded therein, and the PLAYLIST directory and playlist files recorded in a playlist information area thereof. The clip information area has the CLIPINFO directory and associated clip information files recorded therein. The A/V stream area has the A/V streams (where additional content data are interleaved) for the various titles recorded therein.

Video and audio data are typically organized as individual titles; for example, different movies represented by the video and audio data are organized as different titles. Furthermore, a title may be organized into individual chapters in much the same way a book is often organized into chapters.

Figure 3:
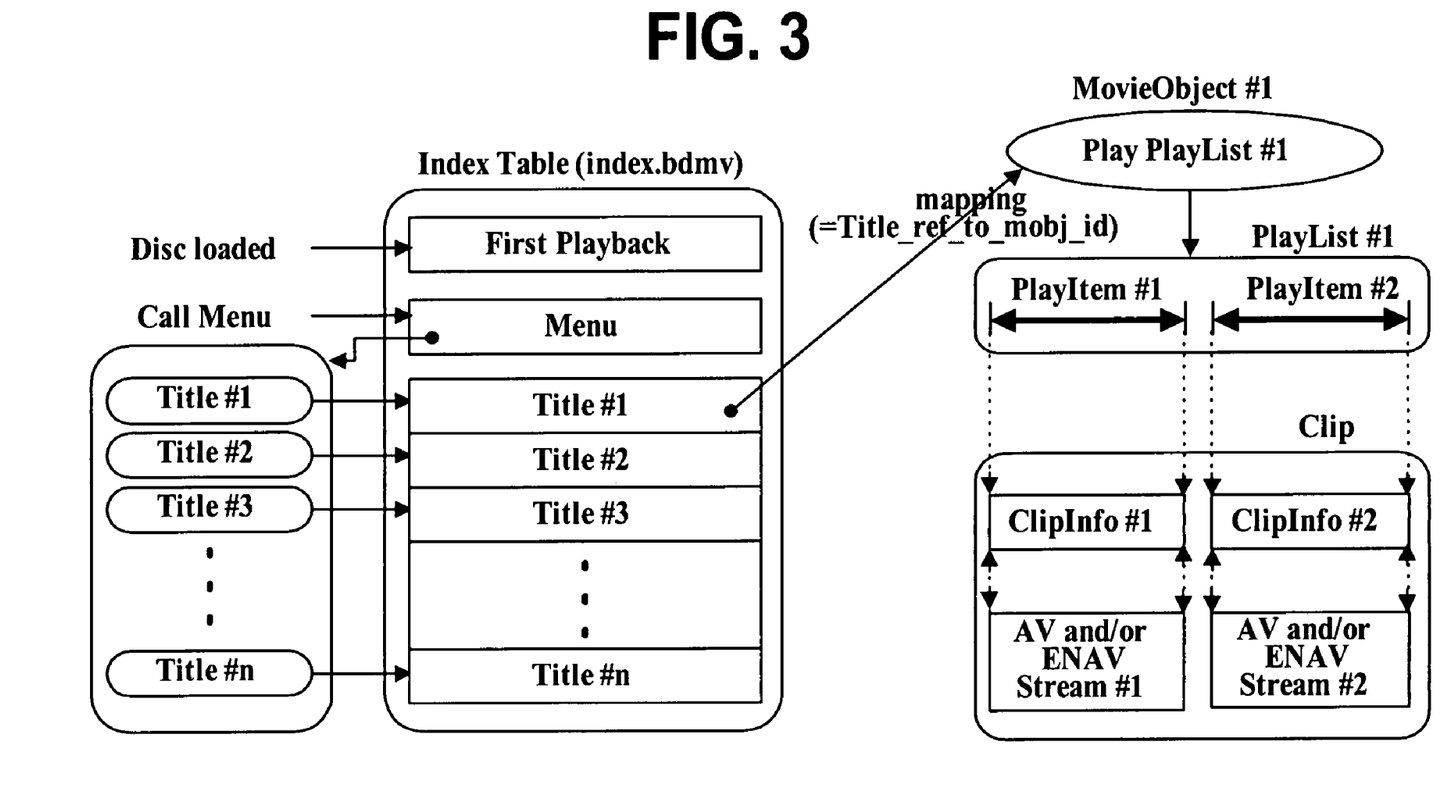
FIG. 3 illustrates a data structure recorded on a BD-ROM in accordance with the present invention.

The data structure according to the present invention includes an illustrative structure shown in FIG. 3 and also includes navigation information for managing main video data and additional content data in the structure of FIG. 3 recorded on the recording medium.

In the data structure of FIG. 3, the index file index.bdmv includes an index table 'Index Table' having the main menu 'Menu' and title information and a first playback 'First Playback' information, and the information in the index table performs reproduction of a corresponding data through link information one to one mapping the specific object in the corresponding object file 'MovieObject.bdmv'.

Accordingly, the main menu information in the index table 'Index Table' is performed by a user request "Call Menu", and in the main menu, a basic title menu 'Title' is included, thus the user can select one of the title menu the user wants to reproduce.

If the user selected the title #1, the title #1 is mapped to an object i.e., MovieObject #1 determined by link information in the title #1 information of the index table, the play list, for example PlayList #1, determined by corresponding command in the corresponding object is reproduced.

The play list PlayList #1 including at least one play item PlayItem performs the clip file 'Clip' for reproducing the specific data, e.g., video data and/or additional content data corresponding to the title #1.

The first playback 'First Playback' information in the index table 'Index Table', the first playback information including link information being automatically loaded when the disc is loaded, is reproduced by the play list file and clip file in the same way the title #1 is reproduced.

Accordingly, in the process for reproducing the corresponding title, started from the main menu, although the user can select the method for reproduction only through the main menu information, the main menu is limitedly provided with only main menu information needed for the total disc, and there is a limitation in properly providing the main menu according to the attribution of the recorded data, e.g., video data and/or additional content data.

The above-explained data structures writing according to the present invention may be applicable to the manufacturing process in case of a read-only disk like BD-ROM.

The additional content data written in an MPEG2 transport stream clip file (*.m2ts) consist of language data, e.g., HTML or XHTML markup language data or Java script. The additional content data may be called ENAV (Enhanced Audio Video or Enhanced NAVigation) data, therefore, 'ENAV data' denoted hereinafter means such additional content data. The navigation information for the additional content data is written under the 'ENAVNAVI' directory as aforementioned.

The startup menu file 'startupmenu.enav' has data, e.g., script of markup language to make and present menu items for the additional content navigation files (*.mls). The menu items are displayed onto a browser screen by execution of the script written in the startup menu file. The startup menu file 'startupmenu.enav' is initiated by a user's key input or a control operation of a disk apparatus conducted at an initial operation for reproduction.

The additional content navigation file (*.mls) has linking information to a clip file where ENAV data are included, a clip information file associated with the clip file, or a playlist file including the clip file in its playing sequence. The linking information can be filename of the additional content navigation file. The additional content navigation file includes reproduction managing information, e.g., information of an interleaving unit and location of start ENAV data packet in a stream for ENAV data interleaved with main A/V data, and further includes script information to initialize necessary devices and/or browser for presentation of the ENAV data.

On the other hand, a clip information file associated with a clip file including ENAV data interleaved with main A/V data can have information to indicate that ENAV data are included in a data stream.

Figure 4:
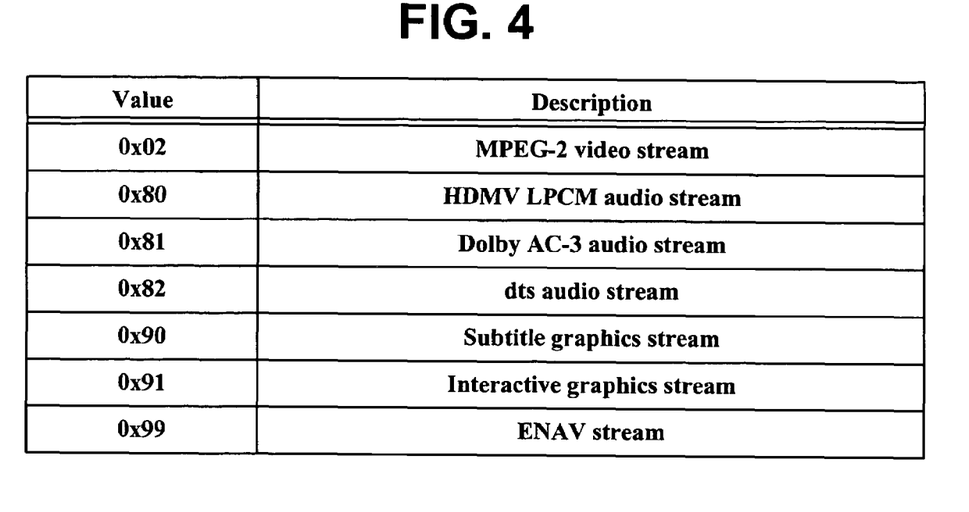
FIG. 4 shows an illustrative table to assign stream IDs to various streams recorded on a BD-ROM according to the present invention.

The ENAV data has a unique ID that is different from those assigned to main A/V stream. FIG. 4 shows an ID assignment table where 0x02 is assigned to a video stream, 0x80, 0x81 and 0x82 to an audio stream, 0x90 to a subtitle graphic stream, 0x91 to an interactive graphic stream, and new value, 0x99 to the ENAV data stream. The newly assigned value, 0x99 is written in a header of, e.g., PES packet including ENAV data in its body.

Figure 5:
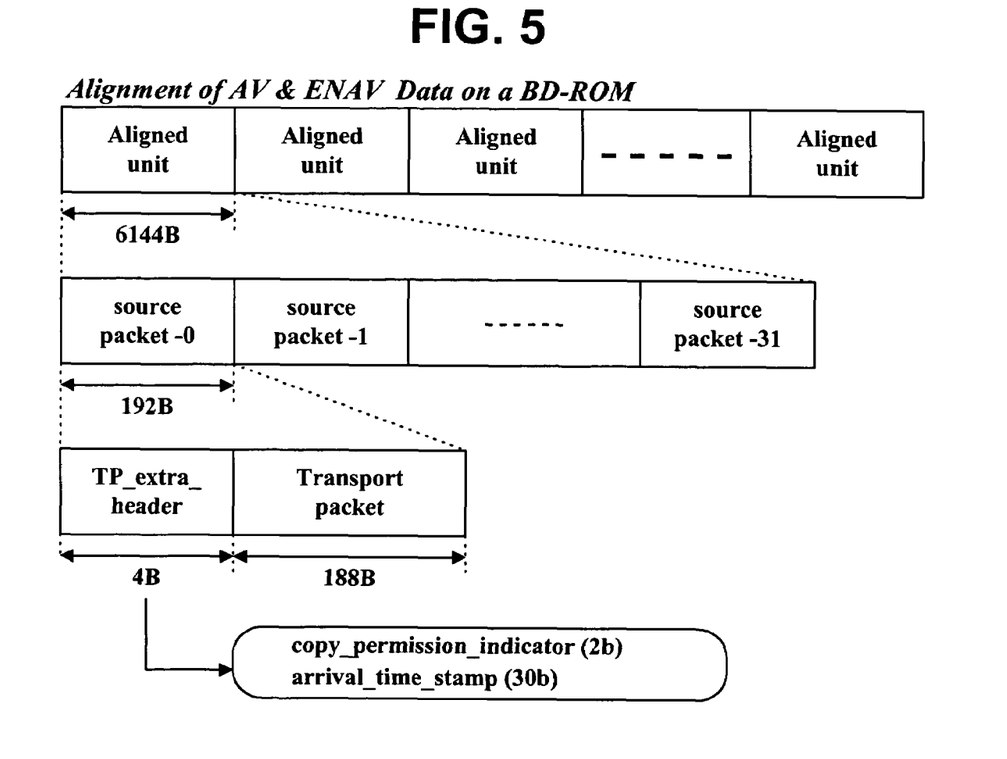
FIG. 5 illustrates interleaved alignment of A/V data and ENAV data on a BD-ROM according to the present invention.

The main A/V stream and ENAV stream in an A/V clip file can be interleaved each other in a predetermined-sized unit not a PES packet. For example, they can be interleaved by three sectors (6144(=3×2048) bytes in size) as shown in FIG. 5. One aligning unit (three sectors) includes 32 transport packets, each consisting of 4-byte TP extra header and 188-byte body. The 30-bit ATS (arrival time stamp) in the TP extra header can be used to synchronize main A/V data and ENAV data.

Figure 6A:
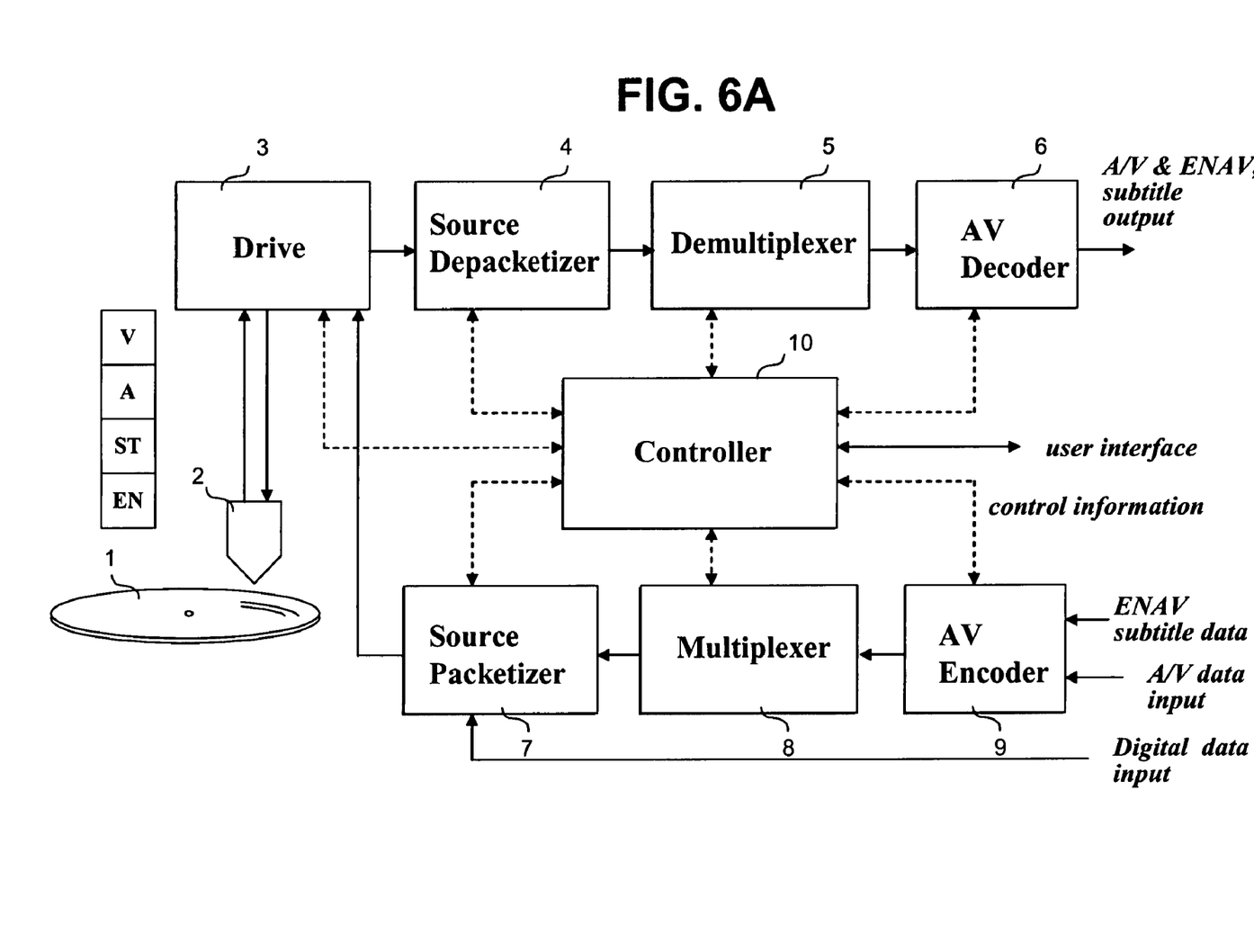
FIGS. 6A and 6B illustrate schematic diagrams of an embodiment of an optical disk recording and reproducing apparatus according to the present invention.

FIG. 6A illustrates a schematic diagram of an embodiment of an optical disk recording and reproducing apparatus according to the present invention. As shown, an AV encoder 9 receives and encodes audio and video data, subtitle data, or ENAV data. The AV encoder 9 outputs the encoded audio and video data along with coding information and stream attribute information. A multiplexer 8 multiplexes the encoded audio and video data (or subtitle data, ENAV data) based on the coding information and stream attribute information to create, for example, an MPEG-2 transport stream. A source packetizer 7 packetizes the transport packets from the multiplexer 8 into source packets in accordance with the audio/video, subtitle, or ENAV format of the optical disk. As shown in FIG. 6A, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk. At this time, the controller 10 controls the source packetizer 7 to align the audio/video data packets and ENAV data packets in interleaved manner.

The controller 10 also creates the navigation and management information for managing reproduction of the audio/video data and ENAV data being recorded on the optical disk. For example, based on information received via the user interface (e.g., instruction set saved on disk, provided over an intranet or internet by a computer system, etc.) the controller 10 controls the drive 3 to record the data structure of FIGS. 1 to 3, and 5 on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video and ENAV source packets from the optical disk. For example, the user input may specify a playlist or a title to reproduce. This user input may be specified, for example, via a menu based graphical user interface preprogrammed into the controller 10. Using the user input and the management and navigation information reproduced from the optical disk, the controller 10 controls the sequential reproduction of clip files associated with the specified title or playlist.

For example, if a title or a playlist is chosen, the controller 10 examines management information for the chosen title or playlist, and determines the first clip file pertaining to the title or playlist. Afterwards, the controller 10 examines a clip information file under the CLIPINF directory and/or an additional content navigation file under the ENAVNAVI directory associated with the first clip file to know whether the clip file includes interleaved ENAV data. If ENAV data are included, the controller 10 controls a demultiplexer 5 and an AV decoder 6 to separate and decode ENAV data accordingly, otherwise, it conducts ordinary reproducing operation of the A/V clip file.

The reproduced source packets are received by a source depacketizer 4 and converted into a data stream (e.g., an MPEG-2 transport packet stream). The demultiplexer 5 demultiplexes the data stream into encoded video and audio, ENAV, and/or subtitle data. The AV decoder 6 decodes the encoded data to produce the original audio and video, ENAV, and/or subtitle data that was fed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

Figure 6B:
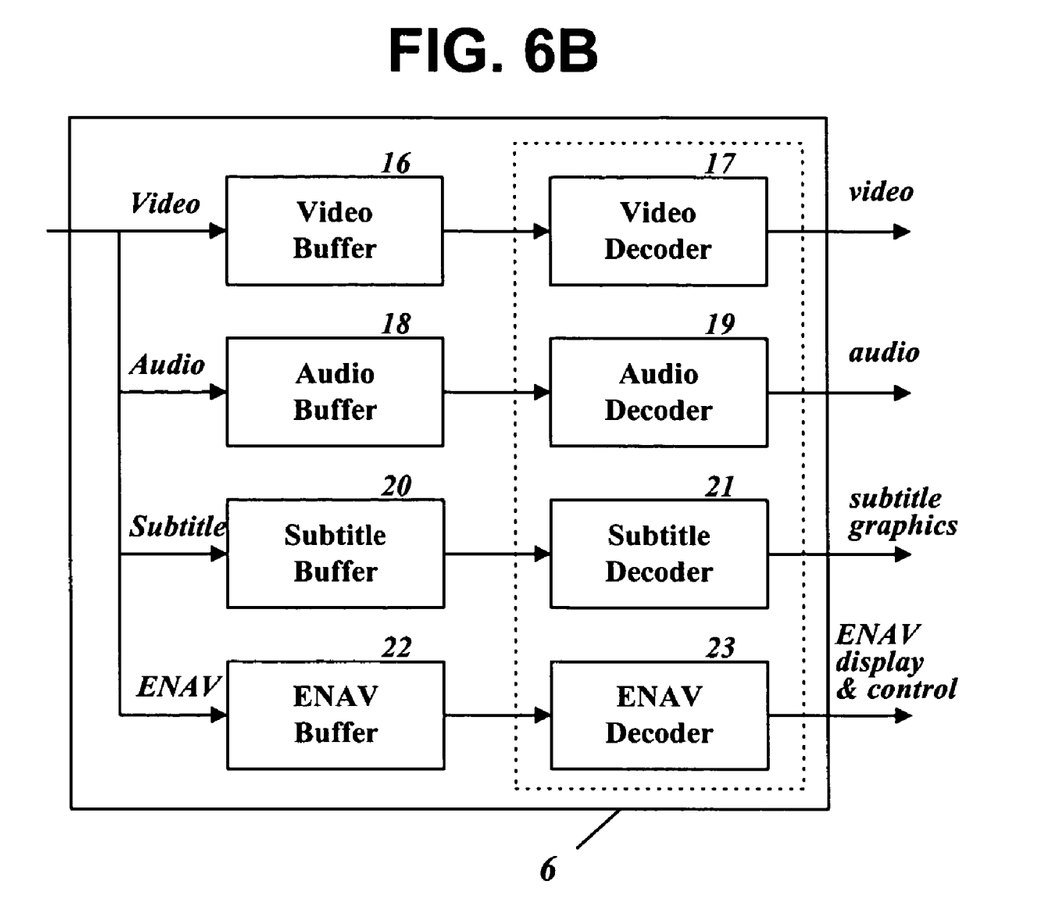

The AV decoder 6 has the detailed structure shown FIG. 6B to decode subtitle and ENAV data as well as audio and video data. That is, the AV decoder 6 comprises four buffers 16, 18, 20, 22 for buffering demultiplexed video, audio, subtitle and ENAV data, respectively and four sub-decoders 17, 19, 21, 23 for decoding out the buffered data adequately. If the ENAV data are markup language scripts, the ENAV sub-decoder 23 interprets the ENAV data, instead of decoding, to conduct interpreted operations with the aid of the controller 10.

On the other hand, the controller 10 reads the startup menu file 'startupmenu.enav' under the ENAVNAVI directory and executes the script written therein at a user's request or at initial controlling operation, thereby displaying menu items related with ENAV data on a displaying browser. If a certain menu item is selected, the controller 10 conducts an ENAV data reproducing operation pre-assigned to the selected menu item.

While FIG. 6A has been described as a recording and reproducing apparatus, it will be understood that only a recording or only a reproducing apparatus may be provided using those portions of FIG. 6A providing the recording or reproducing function.

The present invention, disclosed with respect to a limited number of embodiments, provides a greater level of flexibility in simultaneous reproduction of audio/video data and additional content data than previously available.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

The invention claimed is:

1. A recording medium for being read by a reproducing apparatus and having a data structure for managing additional content data of main data recorded on the recording medium, comprising:
 a data area storing a clip file including main data and/or additional content data of the main data, the additional content data including markup language or Java script;
 a navigation area storing at least one navigation file, the navigation file including at least one navigation command group, at least one navigation command group including at least one navigation command for managing reproduction of the clip file including the additional content data to be reproduced with main data recorded on the recording medium, at least one command group indicating at least one playlist file including reproducing information related with the additional content data;
 a playlist area storing the playlist file including at least a pair of in-point and out-point that point to presentation times on a time axis of the clip file, and the playlist area separate from the navigation area; and
 a clip information area storing at least one clip information associated with the clip file, the clip information file includes information mapping a presentation time stamp to a source packet address in the clip file,
 wherein the data area having the main data and/or additional content is separate from the navigation, playlist and clip information areas, and the main data is able to be reproduced and presented by a decoder of the reproducing apparatus, and the additional content data is able to be reproduced and interpreted by the decoder of the reproducing apparatus.

2. The recording medium of claim 1, wherein the additional content data are interleaved with the main data in the clip file.

3. The recording medium of claim 2, wherein an interleaving unit between the main data and the additional content data is three sectors.

4. The recording medium of claim 1, wherein the additional content data has a stream ID different from that of the main data.

5. The recording medium of claim 1, wherein the navigation area further stores additional content navigation file has search information and/or behavior information for the additional content data.

6. The recording medium of claim 5, wherein the additional content navigation file is recorded under a directory named to 'ENAVNAVI' created under a root directory area of the recording medium.

7. The recording medium of claim 1, wherein the additional content navigation file has a script written in markup language such as XHTML.

8. The recording medium of claim 1, wherein the additional content navigation file has link information to associate with a playlist or a clip information file that is associated with a clip file including the additional content data.

9. The recording medium of claim 1, wherein the navigation area further stores a startup file for menu displaying operation of the additional content data.

10. The recording medium of claim 9, wherein the startup file has a script written in markup language such as XHTML.

11. The recording medium of claim 1, wherein, if the clip file includes additional content data, the clip information file associated with the clip file has information to indicate that additional content data are included.

12. The recording medium of claim 1, wherein the navigation file is located under a specific directory area created under a root directory area of the recording medium.

13. The recording medium of claim 12, wherein the specific directory is named to 'BDMV'.

14. A method for recording a data structure for managing additional content data on a recording medium, comprising:
 recording a clip file including main data and additional content data of the main data in a data area, the additional content data including markup language or Java script;
 recording at least one navigation file in a navigation area of the recording medium, such that the navigation file includes at least one navigation command group, at least one navigation command group includes at least one navigation command for managing reproduction of the clip file including the additional content data to be reproduced with the main data recorded on the recording medium, at least one command group indicates at least one playlist file including reproducing information related with the additional content data;
 a playlist area storing the playlist file including at least a pair of in-point and out-point that point to presentation times on a time axis of the clip file, and the playlist area separate from the navigation area; and
 recording at least one clip Information file in a clip Information area, wherein the clip information associated with the clip file includes information mapping a presentation time stamp to a source packet address in the clip filet
 wherein the data area having the main data and/or additional content is separate from the navigation, playlist and clip information areas, and the main data is able to be reproduced and presented by a decoder, and the additional content data is able to be reproduced and interpreted by the decoder.

15. The method of claim 14, wherein, if the clip information file includes additional content data, the clip information file associated with the clip file has information to indicate that additional content data are included.

16. An apparatus for recording a data structure for managing main data and additional content data thereof on a recording medium, comprising:
 an optical pickup configured to record data on the recording medium;
 an encoder configured to encode main data and/or the additional content data; and
 a controller configured to control the optical pickup to record the encoded data as a clip file in a data area of the recording medium, the clip file including main data and/or additional content data, the additional content data including markup language or Java script; and to control the optical pickup to record at least one navigation file in a navigation area of the recording medium, such that the navigation file includes at least one navigation command group, at least one navigation command group includes at least one navigation command for managing reproduction of the clip file including the additional content data to be reproduced with main data recorded on the recording medium, at least one command group indicates at least one playlist file including reproducing Information related with the additional content data; and to control the optical pickup to record the playlist file in a playlist area, the playlist area storing the playlist file including at least a pair of in-point and out-point that point to presentation times on a time axis of the clip file, and the playlist area separate from the navigation area; and to control the optical pickup to record a clip information file in a clip information area, wherein the clip information associated with the clip file includes information mapping a presentation time stamp to a source packet address in the clip file,
wherein the data area having the main data and/or additional content is separate from the navigation, playlist and clip information areas, and the main data is able to be reproduced and presented by a decoder, and the additional content data is able to be reproduced and interpreted by the decoder.

17. The apparatus of claim 16, wherein, if the clip information file includes additional content data, the clip information file associated with the clip file has information to indicate that additional content data are included, wherein the controller is configured to identify whether the additional content data are included in the clip file based on the clip information file.

18. A method for reproducing a data structure for managing additional content data recorded on a recording medium, comprising the steps of:
reproducing a navigation file recorded in a navigation area of the recording medium, the navigation file including at least one navigation command group, the navigation command group including at least one navigation command for managing reproduction of a clip file including main data and additional content data recorded on the recording medium, at least one command group indicates at least one playlist file to reproduce including reproducing information related with the additional content data;
reproducing the playlist file from a playlist area, the playlist area storing the playlist file including at least a pair of in-point and out-point that point to presentation times on a time axis of the clip file, and the playlist area separate from the navigation area;
reproducing a clip information file recorded in a clip information area of the recording medium, wherein the clip information associated with a clip file includes information mapping a presentation time stamp to a source packet address in the clip file;
reproducing the main data and the additional content data based on the navigation command, the playlist file and the clip information file, the additional content data including markup language or Java script; and
presenting the reproduced main data, and interpreting the reproduced additional content data and conducting an interpreted operation,
wherein the data area having the main data and/or additional content is separate from the navigation, playlist and clip information areas, and the main data is able to be reproduced and presented by a decoder, and the additional content data is able to be reproduced and interpreted by the decoder.

19. The method of claim 18, wherein if the clip information file includes additional content data, the clip information file associated with the clip file has information to indicate that additional content data are included.

20. An apparatus for reproducing a data structure for managing main data and additional content data thereof recorded on a recording medium, comprising:
an optical pickup configured to reproduce data recorded in a data area on the recording medium;
a decoder configured to present the reproduced main data, and, the decoder configured to interpret the reproduced additional content data and conduct an interpreted data operation; and
a controller configured to control the optical pickup to reproduce a navigation file recorded in a navigation area on the recording medium, the navigation file including at least one navigation command group, the navigation command group including at least one navigation command for managing reproduction of a clip file including main data and additional content data recorded on the recording medium, at least one command group indicates at least one playlist file to reproduce including reproducing information related with the additional content data; and to control the optical pickup to reproduce the playlist file from a playlist area, the playlist area storing the playlist file including at least a pair of in-point and out-point that point to presentation times on a time axis of the clip file, and the playlist area separate from the navigation area, and to control the optical pickup to reproduce a clip information file recorded in a clip information area of the recording medium, wherein the clip information associated with a clip file includes information mapping a presentation time stamp to a source packet address in the clip file; and to control the optical pickup to reproduce additional content data based on the navigation command, the playlist file and the clip information file, the additional content data including markup language or Java script.

* * * * *